July 1, 1930. H. QUEEN 1,769,606
GOGGLES
Filed Aug. 31, 1928
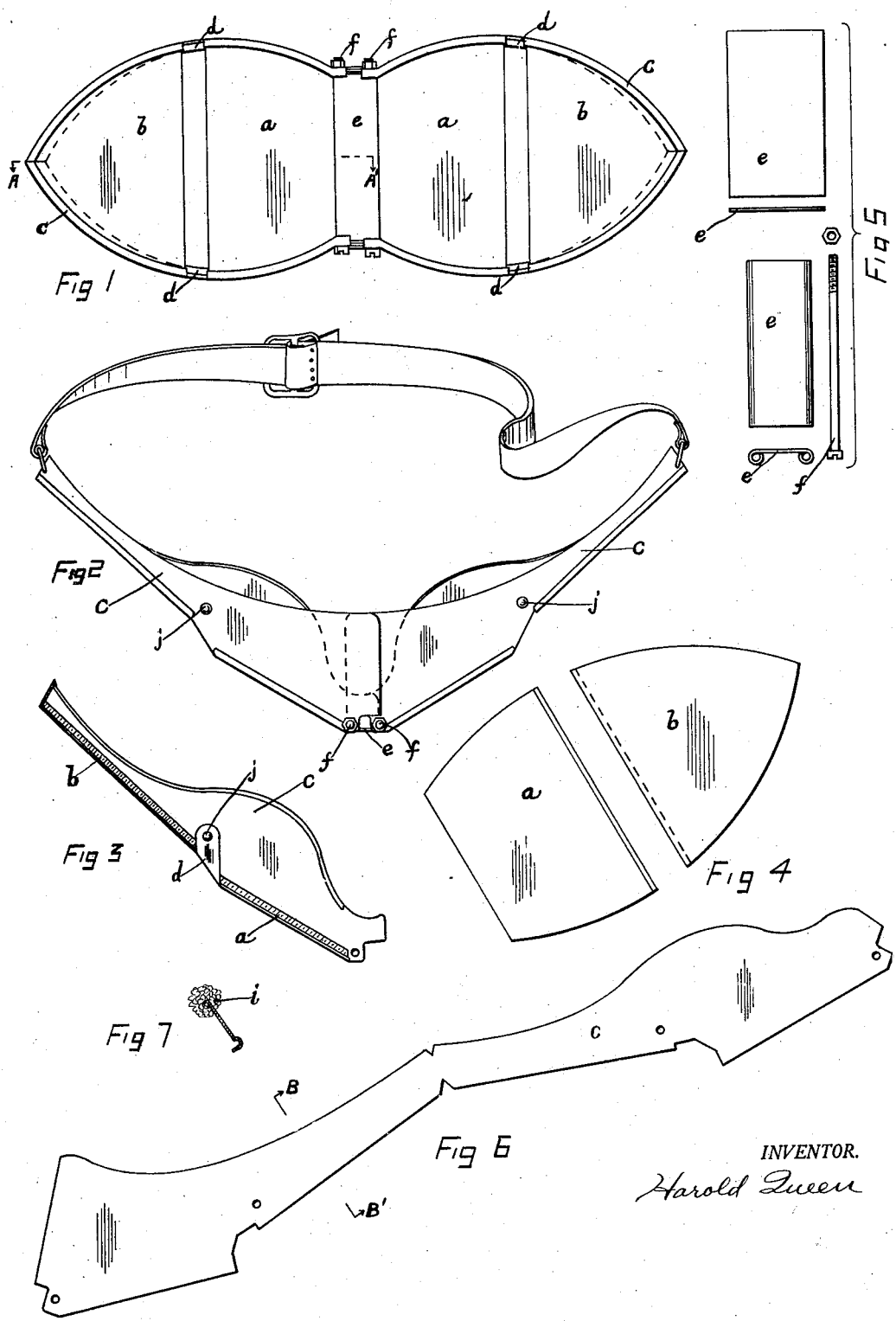
INVENTOR.
Harold Queen Patented July 1, 1930

1,769,606

UNITED STATES PATENT OFFICE

HAROLD QUEEN, OF BERKELEY, CALIFORNIA

GOGGLES

Application filed August 31, 1928. Serial No. 303,224.

It is the object of this invention to provide a pair of goggles which will allow unobscured vision under conditions when the present styles of goggles are obscured, such as in foggy or rainy weather when moisture collects on glasses, when snow accumulates, when there are particles of dust in the air encountered, or when a material such as oil has become smeared on the glasses.

Referring to the drawing:

Fig. 1 is a front view of the assembled goggles.

Fig. 2 is a top view of th assembled goggles illustrating the oblique positions of the shields.

Fig. 3 is a top sectional view of the shields $a$ and $b$ of one unit taken on line AA' of Fig. 1 showing the relative positions of the shields.

Fig. 4 is a projection of the shields $a$ and $b$ of one unit onto a vertical plane parallel to shield $a$.

Fig. 5 illustrates the blank from which the link $e$ is formed, also the formed link and the bolts and nuts by means of which the two units are attached to the link $e$.

Fig. 6 illustrates the blank from which the frames are formed.

Fig. 7 is a cross section of the frame taken on line BB' of Fig. 6, but shows the frame formed and the cushion $i$ attached.

Shields $a$ and $b$ are thin sheets of any material, preferably transparent. Shield $a$ occupies an approximately vertical position and is oblique to the direction of motion when the line of vision coincides with the direction of motion. The trailing edge of shield $a$ is preferably beveled parallel to the line of vision to prevent the edge appearing blurred to the eye. Shield $b$ occupies an approximately vertical position, is oblique to the direction of motion, and may or may not be parallel to shield $a$. Shield $b$ occupies a position wholly to the rear of shield $a$ and wholly to the outside of the line of vision where said line of vision touches the trailing edge of shield $a$.

Shields $a$ and $b$ are held in their proper relative positions by a frame $c$ having a channel formed in its front edge to receive the shields. The shields $a$ and $b$ are held apart by spacers $dd$ shown in Fig. 3 leaving a space or gap between the shields. The two frames $cc$ are held together by means of a link $e$ and two bolts $ff$ with nuts. Tightening of the bolts $ff$ forces the shields $a$ and $b$ away from the link $e$ due to the curved form of the frame $c$. The spacers $dd$ are pivoted on the pins $jj$ to allow the spacers to move slightly with the shields during the tightening of the bolts $ff$ in assembling.

Various widths of link $e$ are provided by means of which the distance between the two gaps may be varied to suit the differing widths between eyes of different wearers. An adjustable strap is attached to the outer ends of the frames to pass around the head for holding the goggles before the eyes. A soft and resilient material $i$ is placed on the rear edge of the frames to cushion them against the head of the wearer. The edges of the two frames $cc$ slide over each other scissors fashion where they meet behind the link $e$. When not in use the frames $cc$ may be straightened out into line by revolving about the bolts $ff$ and placed in a suitable case for carrying.

In operation, the air encountered by shield $a$ is given a lateral motion and caused to jump the gap between shields $a$ and $b$. The air directly in front of the gap between shields $a$ and $b$ upon encountering the air deflected by shield $a$ is also given a lateral motion. Shield $b$ receives the deflected air above mentioned and further deflects it beyond the ends of the goggles. Shield $b$ is staggered to the rear of shield $a$ such that the air deflected from shield $a$ will impinge upon the front of shield $b$ rather than pass through the gap. Shield $b$ is drawn laterally away from shield $a$ such a distance that unobscured vision is allowed between the two shields $a$ and $b$. When shields $a$ and $b$ have become obscured vision is still possible between the shields and without sufficient air entering through the gap to cause the eye to squint or water or be otherwise inconvenienced.

What I claim is:

1. In a pair of goggles of the character described, two forward shields, two rear shields and a frame adapted to hold these four shields in substantially vertical planes oblique to a plane of symmetry, each forward shield being wholly in front of and wholly to the side of its respective rear shield such a distance that a gap is provided between the trailing edge of each forward shield and the leading edge of its respective rear shield.

2. In a pair of goggles of the character described, a frame, two forward shields oblique to a plane of symmetry and having their trailing edges beveled parallel to said plane of symmetry, and two rear shields also oblique to said plane of symmetry and having their leading edges beveled parallel to said plane of symmetry and placed wholly to the rear and side of their respective forward shields such a distance that a gap is provided between each rear shield and its respective forward shield.

3. In a pair of goggles of the character described, two forward shields, two rear shields, a frame adapted to hold these four shields in substantially vertical planes oblique to a plane of symmetry and in such relative positions that each forward shield is wholly in front of and wholly to the side of its respective rear shield such a distance that a gap is provided between the trailing edge of each forward shield and the leading edge of its respective rear shield, and spacers between said forward shields and their respective rear shields, said spacers being adjustably attached to said frame in such a manner as to move with the shields when the frames are tightened on the shields.

4. In a pair of goggles of the character described, two forward shields, two rear shields, and a frame adapted to hold the shields in substantially vertical planes oblique to a plane of symmetry, and spacers attached to the frame between each forward shield and its respective rear shield in such a manner as to provide an air gap between each forward shield and its respective rear shield, and means for holding the goggles before the eyes of the wearer.

In testimony whereof I affix my signature.

HAROLD QUEEN.